Figure 1:
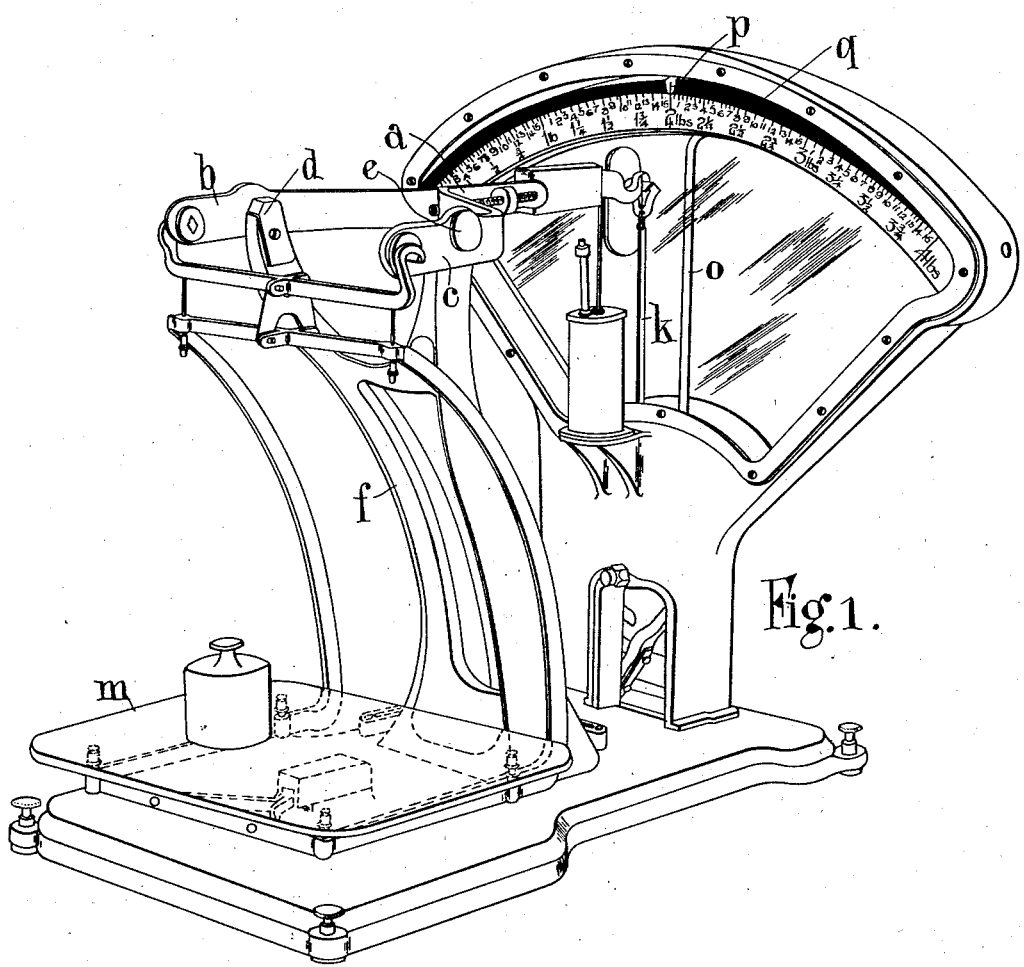

G. HUTCHINSON.
WEIGHING SCALE.
APPLICATION FILED AUG. 25, 1911.

1,099,051.

Patented June 2, 1914.
2 SHEETS—SHEET 1.

Witnesses.
J. P. Davis
F. D. Rollhaus

Inventor.
George Hutchinson
By Mundles
Attorneys

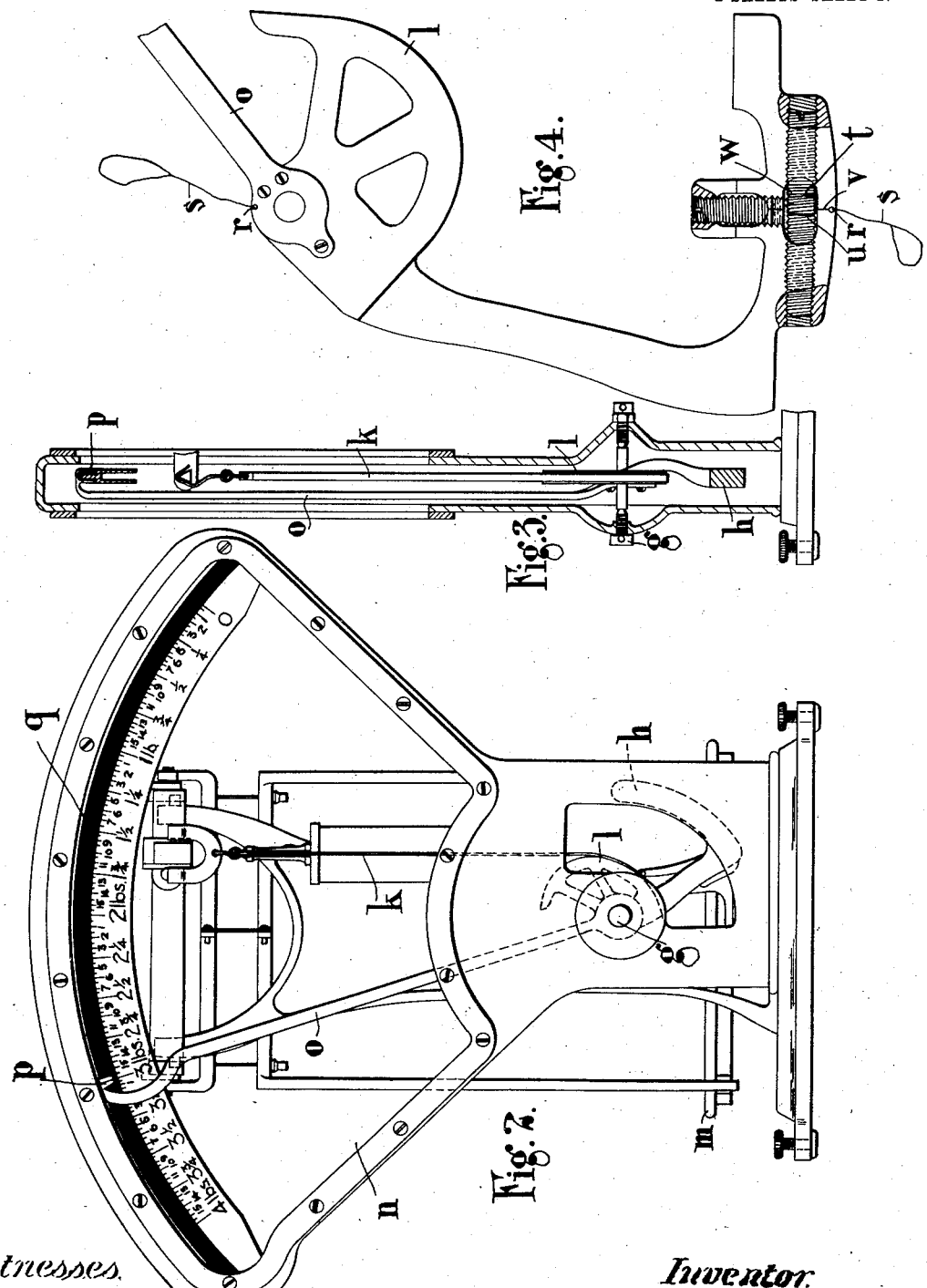

UNITED STATES PATENT OFFICE.

GEORGE HUTCHINSON, OF CHRISTCHURCH, NEW ZEALAND.

WEIGHING-SCALE.

1,099,051.   Specification of Letters Patent.   Patented June 2, 1914.

Application filed August 25, 1911. Serial No. 645,972.

*To all whom it may concern:*

Be it known that I, GEORGE HUTCHINSON, a subject of the King of Great Britain and Ireland, and residing at Hereford street, Christchurch, in the Provincial District of Canterbury, in the Dominion of New Zealand, have invented certain new and useful Improvements in or Relating to Weighing-Scales, of which the following is a specification.

This invention relates to weighing scales and more particularly to scales of the pendulum and spring types, and has for its object to devise means whereby it is made possible to produce a pendulum scale in which the dial is at right angles to the beam or steelyard actuating the pointer thus effecting considerable economy in the space occupied by the scale and causing the dial to face the salesman squarely while he operates the goods upon the pan whereas in constructions hitherto known the steelyard has actuated a pendulum which has always been set to swing in a plane tandem to that of the steelyard and as a necessary consequence the dial also has been placed tandem to the steelyard.

In the accompanying drawings, Figure 1 is a perspective view showing one convenient construction of scale according to my invention. Fig. 2 is a rear elevation. Fig. 3 is a sectional elevation showing the dial and pointer. Fig. 4 is a modified form of pendulum.

In carrying my invention into effect in one convenient manner as in its application to a weighing scale of the type, in which an upward pull is exerted upon a strap by the beam or steelyard for the purpose of actuating the pendulum as described, for example, in British specification No. 14495 of 1909, I employ a beam preferably having a wide base along the fulcrum knife edge line for a purpose which will be hereinafter apparent, one convenient method of obtaining such wide base being to employ a bifurcated or forked beam, $a$, the two arms, $b$ $c$, of the fork being supported upon the fulcrum knife edges $d$, $e$, fixed in any suitable bracket, $f$, or other part of the frame of the machine and in addition I may employ suitable end stops to prevent sliding movement of the beam upon the knife edges. The beam is preferably situated at a considerable height above the point of suspension, $g$ of the pendulum, $h$, in order to minimize any error which might be caused in the readings due to any slight movement of the end of the steelyard to one side or the other causing alteration in the angular direction of the pull of the strap.

The pendulum $h$, which is similar to that described in the before mentioned specification, may have its body portion comparatively thin in the axial direction and such pendulum may be formed from an integral piece of aluminium or other suitable material, to which lead may be added or from which lead may be taken away for the purpose of adjusting the balance, and is supported upon a short spindle or pivot, $i$, having its axis parallel to the direction of the beam or steelyard, $a$, the arrangement being such that when an upward pull is exerted upon the strap $k$, which winds and unwinds upon the cam, $l$, of the pendulum, due to a load placed upon the scale pan, $m$, the pendulum oscillates in a direction at right angles to the beam or steelyard so that any convenient fan or other suitably shaped dial $n$, may also be arranged at right angles to the steelyard instead of being tandem thereto as is usual, whereby considerable saving of space occupied by the complete weighing scale is effected, and whereby the salesman as he stands loading the goods on to the pan faces the dial squarely thus avoiding the danger of antiparallax readings. A scale pan $m$ may be supported upon any suitable bracket $x$ adapted to be controlled by a chain or rod $y$ the pivot of which may be conveniently protected by means of a cover $z$ and as shown dotted in Fig. 1.

It will be obvious that the broad base tends to prevent side-way movement of the beam or steelyard while any error in the reading due to such slight movement of the beam as may be possible even with a broad base is minimized by placing the beam at a considerable distance from the point of suspension of the pendulum.

In order to facilitate the reading upon the dial scale, which may be provided with means for fore and aft adjustment as for example broad shelves or supports and suitable clamps, I prefer to form the pointer arm, $o$, with a blunt or round-nosed pointer, $p$, upon which is marked or otherwise suitably impressed a fine line which itself acts as the usual pointer, the advantage of this arrangement being that the pointer carries as it were its own background and facilitates the reading upon the scale, and I may employ a suitable blackened ridge, *q* upon the dial to act as a background for the pointer arm.

The pendulum being of the type described in the before mentioned specification, is balanced in such a manner that when suspended freely from its bearings a vertical line passing through the point of suspension will pass also through a predetermined point in the lower part of the pendulum. In order to facilitate the operation of balancing I provide upon the pendulum, at any two convenient points on the diametrical line passing through the point of suspension and the predetermined point aforesaid eyelets, *r*, hooks or other equivalent devices or means to which threads, *s*, or the like may be attached. The pendulum may then be lifted by the threads and if its axis remains truly vertical, the balance is correct, but if it cants to one side or the other there is evidence that the balance requires adjusting by adding or reducing metal on one side or the other of the balancing line.

In order to render easy the adjustment of the scale to compensate for wear or for other reasons I may provide a screwed rod or spindle, *t* adjustably mounted in or on the pendulum at right angles to the diametrical line above mentioned, the screw being preferably barred from view but accessible by means of a screw driver and provided at or near its middle with a mark or line *u* initially in register with the balancing line or mark, *v*, thereon, an inspection port, *w*, being left in the pendulum so that the mark may be readily viewed when required. If at any time the screw is moved, this will at once be evident to an expert who may thus determine the amount of departure from the original balance. A similar arrangement may be provided along the balancing line. In these arrangements it is seen that the screw itself forms the adjustable poise.

It will be obvious that my invention is equally applicable to other types of weighing scales such as that in which the pull upon the cam strap is in the downward direction or the type of weighing scale in which the steelyard pulls from the same point in the pendulum throughout the deflection of the latter, and it will be readily understood that I may variously modify the details of construction and the arrangement of the several parts to suit the particular type of weighing scale to which my invention is to be applied.

Having now described my invention, what I claim as new and desire to secure by Letters Patent is:—

1. A weighing scale comprising a beam, a pendulum connected directly to and swinging about a center below said beam and at right angles thereto, and a pointer carried by said pendulum and adapted to swing in a plane at right angles to said beam.

2. A weighing scale comprising a beam, a pendulum connected directly to and swinging about a center below said beam and at right angles thereto, a pointer carried by said pendulum and adapted to swing in a plane at right angles to said beam, and a dial arranged in the plane of the swing of the pendulum.

3. A weighing scale comprising a beam, a pendulum adapted to swing about a center below said beam and at right angles thereto, a cam on said pendulum, a flexible connection connecting said cam directly to said beam, and a pointer carried by said pendulum and adapted to swing in a plane at right angles to said beam.

4. A weighing scale comprising a beam, a pendulum adapted to swing about a center below said beam and at right angles thereto, a cam on said pendulum, a flexible connection connecting said cam directly to said beam, a pointer carried by said pendulum and adapted to swing in a plane at right angles to said beam, and a dial arranged in the plane of the swing of the pendulum.

5. A weighing scale comprising a forked beam having a wide base of support, a pendulum connected directly to and swinging about a center below said beam and at right angles thereto, and a pointer carried by said pendulum and adapted to swing in a plane at right angles to said beam.

6. A weighing scale comprising a beam, a pendulum connected directly to and swinging about a center below said beam and at right angles thereto, a pointer carried by said pendulum and adapted to swing in a plane at right angles to said beam, and a threaded spindle adjustably carried by the pendulum at right angles to the normal balancing line.

7. A weighing scale comprising a beam, a pendulum connected directly to and arranged to swing in a plane at right angles to said beam, a dial arranged in the plane of the swing of said pendulum, a pointer arm carried by said pendulum, and a lug upon said pointer arm carrying a line, the color of which is in contrast to the color of the lug, and a ridge concentric with the dial also in contrast to the lug.

In testimony whereof I have signed my name to this specification in the presence of two subscribing witnesses.

GEORGE HUTCHINSON.

Witnesses:
T. S. COLE,
B. H. MATTHEWS.